Figure 1:
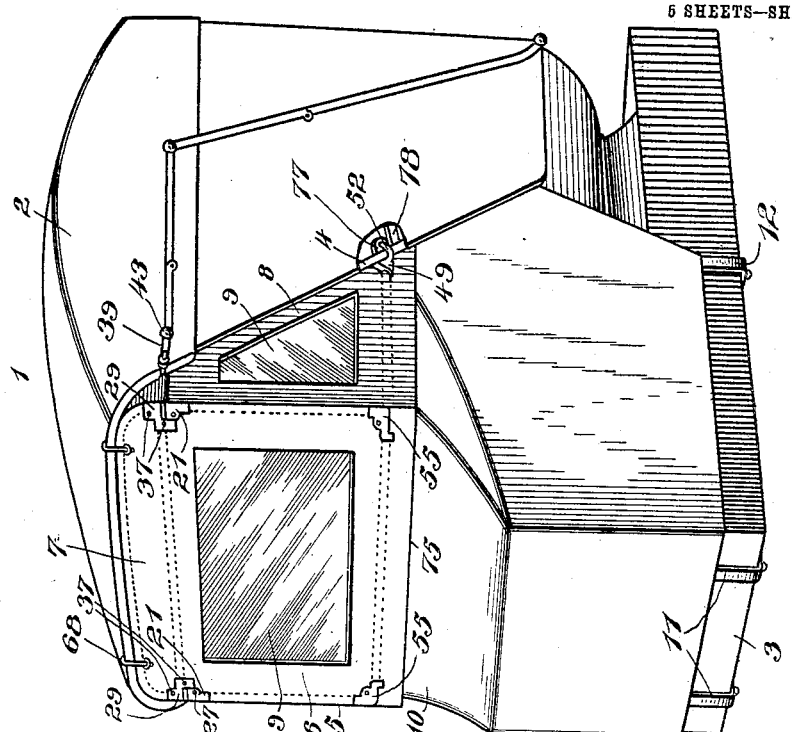

No. 835,134. PATENTED NOV. 6, 1906.
J. M. HARTER.
STORM FRONT FOR VEHICLES.
APPLICATION FILED NOV. 16, 1905.

5 SHEETS—SHEET 1.

Witnesses
T. P. Britt
E. C. Duffy

Inventor
John M. Harter
By C. E. Duffy & Son
Attorneys

No. 835,134. PATENTED NOV. 6, 1906.
J. M. HARTER.
STORM FRONT FOR VEHICLES.
APPLICATION FILED NOV. 16, 1905.
5 SHEETS—SHEET 2.
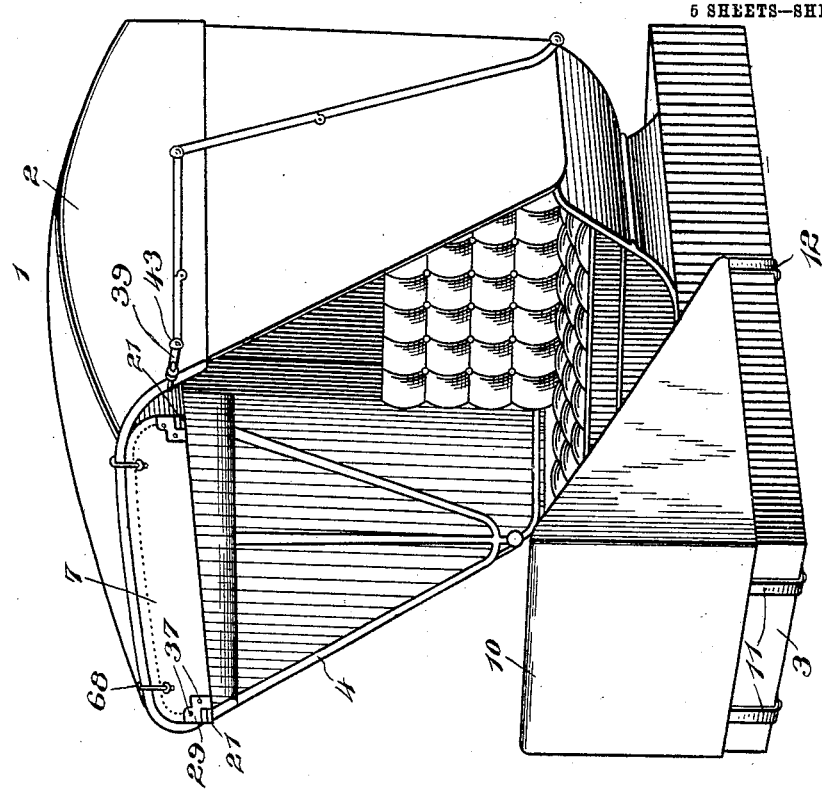
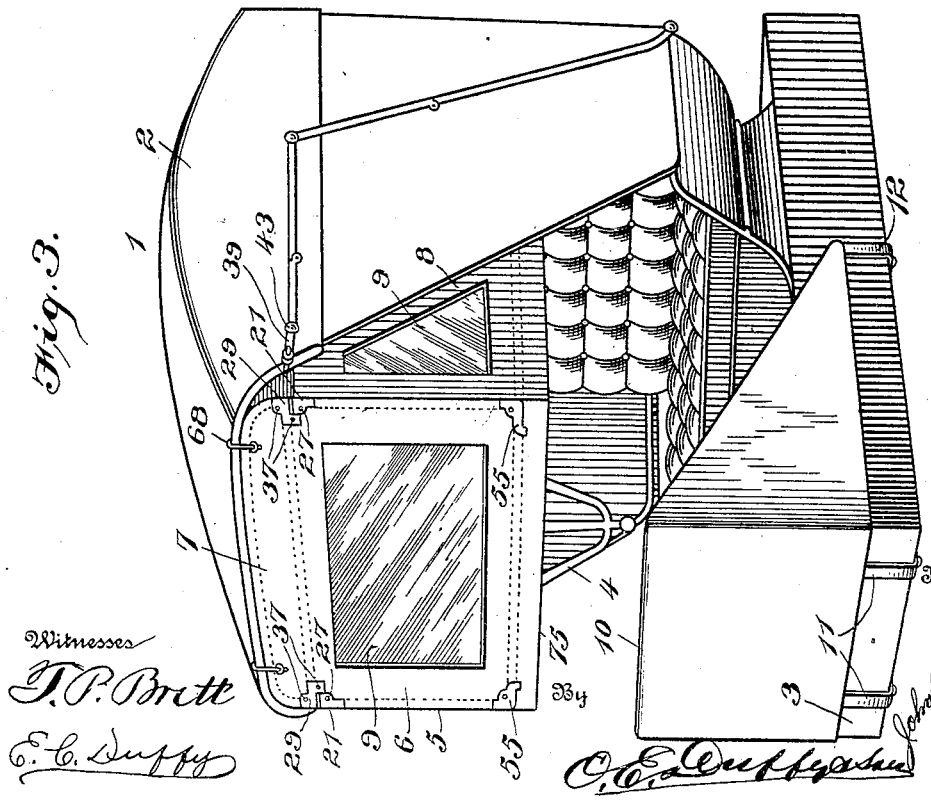

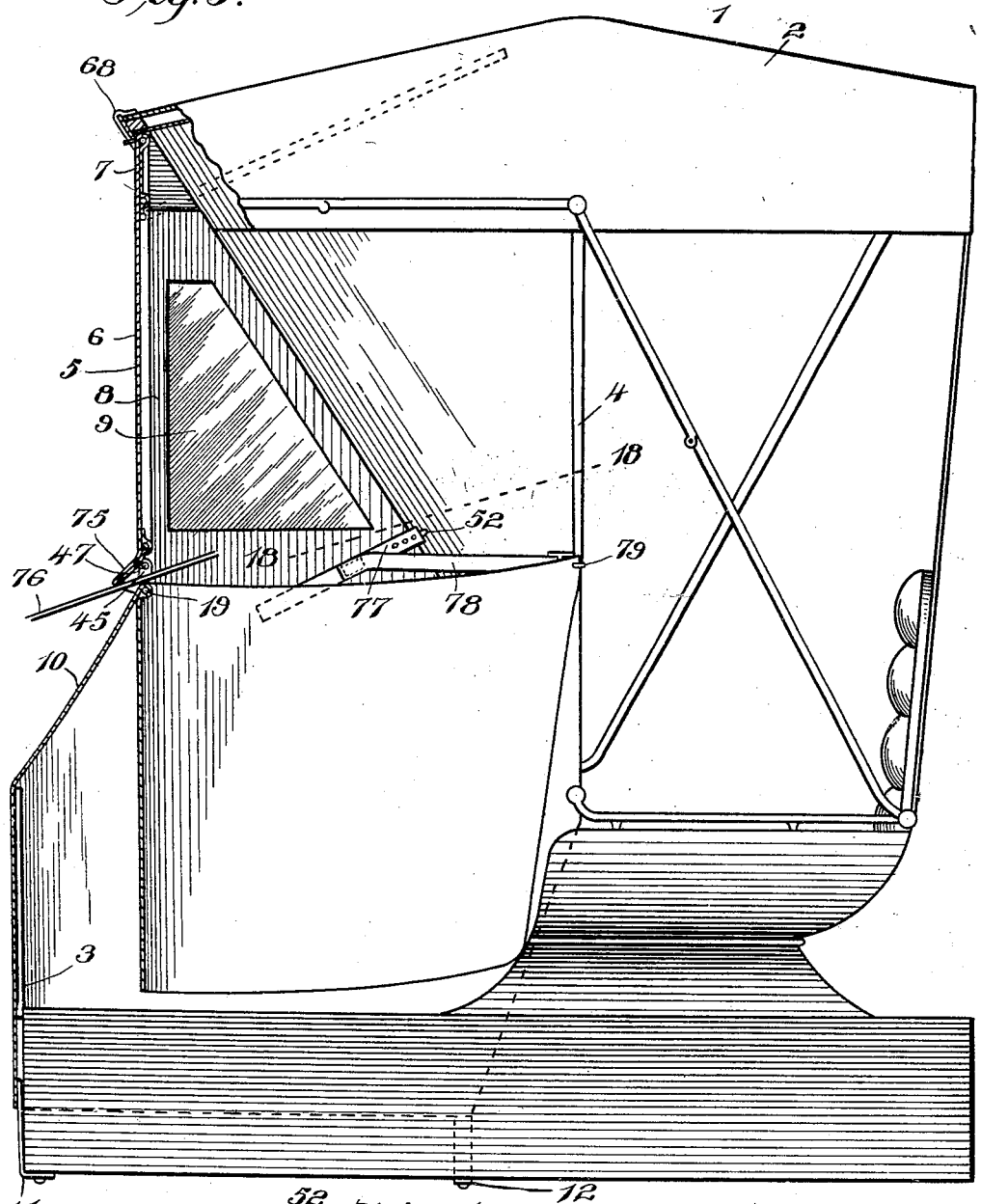

No. 835,134. PATENTED NOV. 6, 1906.
J. M. HARTER.
STORM FRONT FOR VEHICLES.
APPLICATION FILED NOV. 16, 1905.
5 SHEETS—SHEET 4.
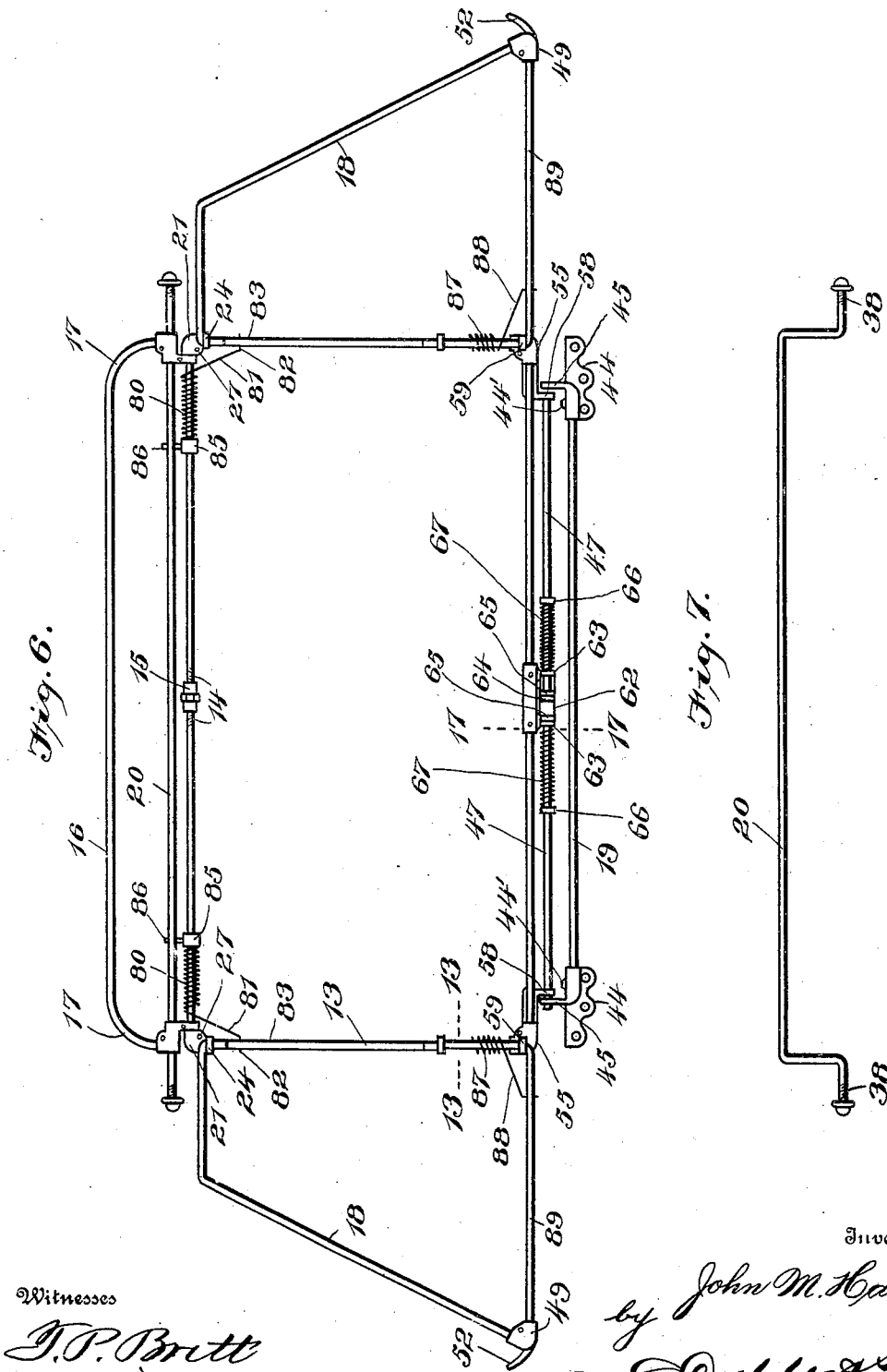
Witnesses
J. P. Britt
E. C. Duffy
Inventor
John M. Harter
by
O. E. Duffy & Son
Attorney No. 835,134. PATENTED NOV. 6, 1906.
J. M. HARTER.
STORM FRONT FOR VEHICLES.
APPLICATION FILED NOV. 16, 1905.
5 SHEETS—SHEET 5.
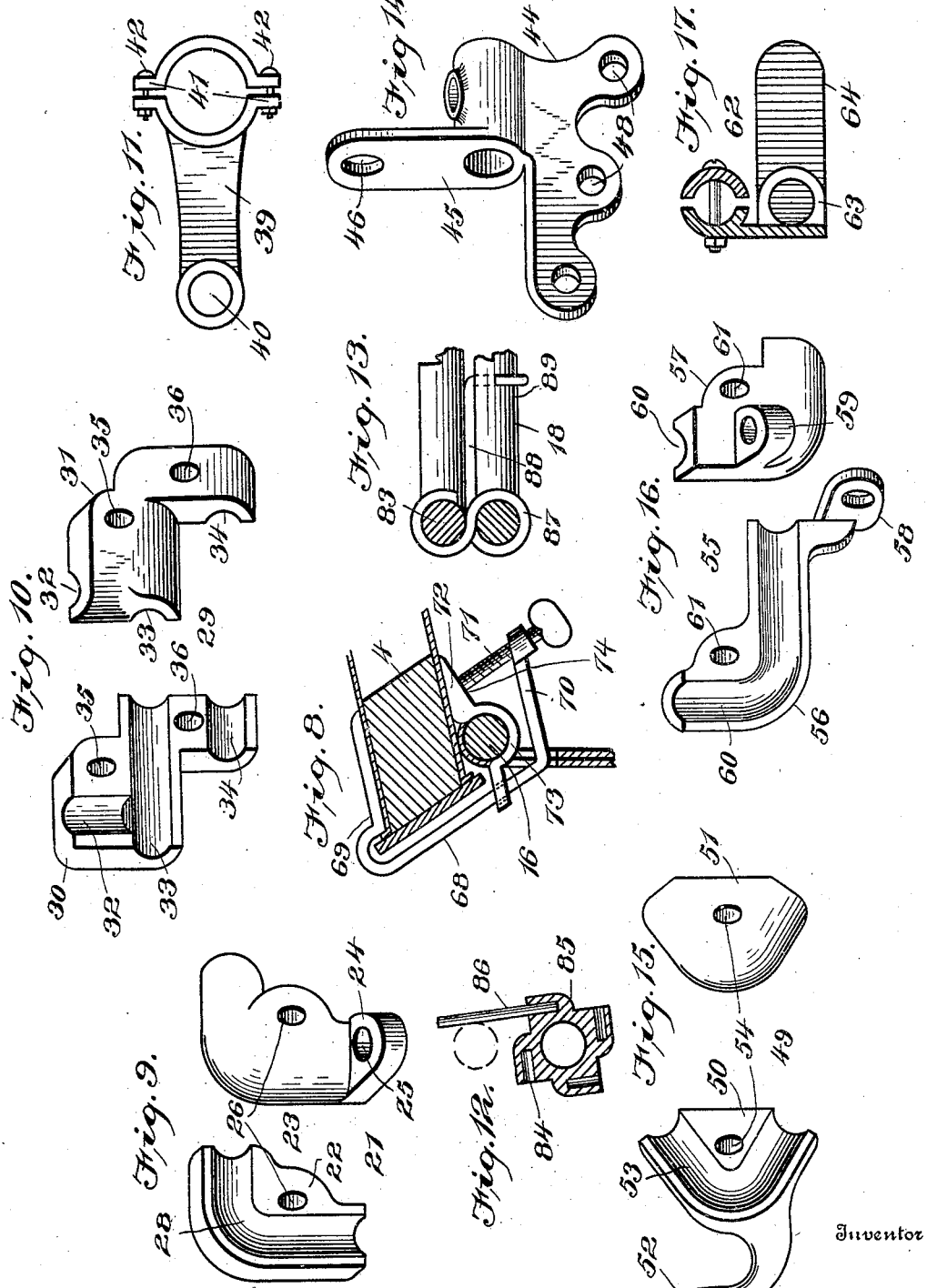

UNITED STATES PATENT OFFICE.

JOHN MILTON HARTER, OF WABASH, INDIANA.

STORM-FRONT FOR VEHICLES.

No. 835,134.  Specification of Letters Patent.  Patented Nov. 6, 1906.

Application filed November 16, 1905. Serial No. 287,731.

*To all whom it may concern:*

Be it known that I, JOHN MILTON HARTER, a citizen of the United States, residing at Wabash, in the county of Wabash and State of Indiana, have invented certain new and useful Improvements in Storm-Fronts; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to storm-fronts for use on buggies, carriages, automobiles, &c., and has for its object to provide a device of this class embodying certain advantages, which will be now fully set forth.

I am familiar with the majority of the practical devices of this class and from careful observation and experiments have simplified and have provided a storm-front embodying advantages of use and construction which make this device simple in its construction, cheap to manufacture, easy and quick to adjust and place in position, safe and practical in its use, and which allows as much room in the vehicle when in position as when not in use.

One of the principal disadvantages in many of the existing storm-fronts is their cumbersome construction, while others are so constructed that when in position there is not sufficient room left in the buggy to permit free use of the arms in driving, which of course is absolutely essential.

Another disadvantage is the difficulty experienced in getting out of the buggy when the storm-front is in position, some of them being so arranged that the front has to be thrown entirely out of its operative position in order to permit a person to enter or emerge from the vehicle. In stormy or bad weather this is particularly annoying, as it allows the occupants, the cushions, and interior of the buggy or vehicle to become wet and disagreeable.

Another disadvantage which I have overcome with this storm-front is the necessity of getting out of the vehicle or of having recourse to the compartments under the buggy-seat when adjusting the device in position, while, furthermore, this storm-front is so constructed that a package or article can be handed out of the vehicle without deranging the storm-front, thus allowing free communication with the outside of the vehicle.

My invention has for its object to overcome all these disadvantages, and with this in view my invention consists in the construction which provides for the same amount of room within the vehicle when the front is in position as there is when the front is not in use and which provides for the free use of the hands and arms in driving.

My invention further consists in the simple construction employed for allowing the driver a clear view ahead and to each side, so as to enable him to control and guide his horse as well when using the storm-front as when the same is not attached.

My invention further consists in the simple construction, allowing free ingress or egress from the vehicle without disturbing any part of the storm-front or storm-apron except one door and one side of apron.

My invention further consists in the construction which provides for the use of the front independent of the storm-apron and also in the construction employed for attaching the storm-front to the storm-apron.

My invention further consists in the construction employed for attaching the storm-front to the vehicle and also in the construction for holding the device in operative position.

My invention further consists in the novel construction of securing the covering of the storm-front to the frame thereof; and my invention further consists in the novel construction of the frame of the device and also in certain other novel features of construction and in combinations of parts, which will be first fully described and afterward specifically pointed out in the appended claims.

Figure 2:
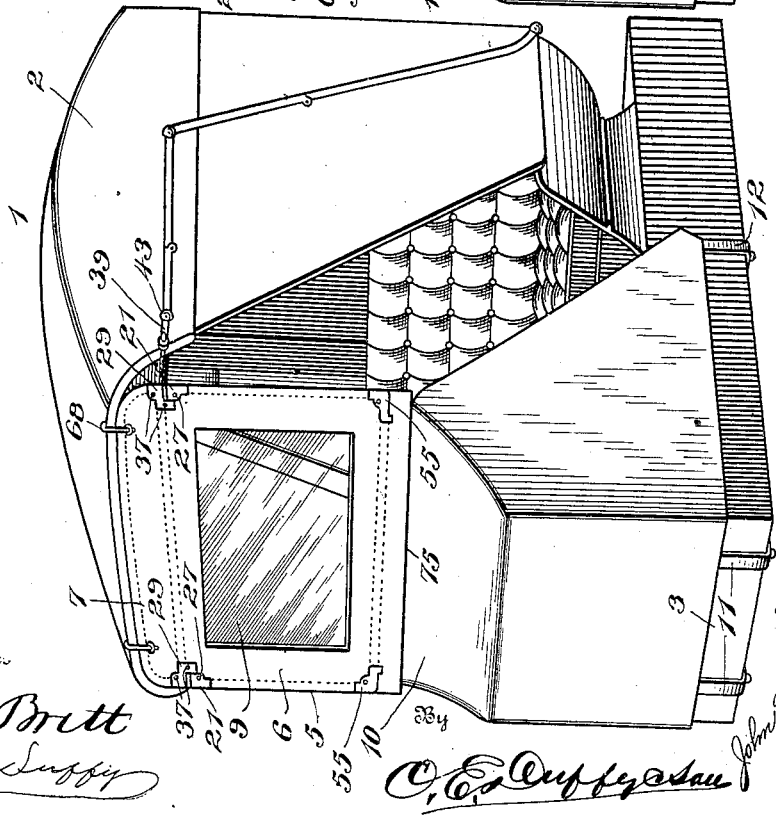

Referring to the accompanying drawings, Figure 1 is a perspective view of a buggy-body, showing storm-front and storm-apron in operative position. Fig. 2 is a similar view showing position of storm-front and apron for allowing ingress and egress to and from the vehicle. Fig. 3 is a perspective view showing storm-front in position without apron attached. Fig. 4 is a perspective view of body of buggy and top, showing position of storm-front folded and not in use. Fig. 5 is an elevation showing storm front and apron in section. Fig. 6 is a plan view of frame of storm-front. Fig. 7 is a top plan of the securing-rod. Fig. 8 is a fragmentary sectional view of edge of buggy top and bow, showing securing storm-front clamp in elevation. Fig. 9 is a perspective view of the two parts of the frame-corners. Fig. 10 is a perspective view of the two parts of the frame-hinges. Fig. 11 is an elevation of the link holding the securing-rod in position. Fig. 12 is a vertical transverse section through the mainspring-adjuster. Fig. 13 is a horizontal sectional view taken on line 13 13 of Fig. 6, showing construction of side-door spring. Fig. 14 is a perspective view of corner for storm-apron. Fig. 15 is a perspective view of the two parts at inner corner of side door, showing securing-hook. Fig. 16 is a perspective view of the two parts of lower corner of storm-front frame. Fig. 17 is a vertical sectional view taken on line 17 17 of Fig. 6. Fig. 18 is a sectional view on line 18 18 of Fig. 5.

Like numerals of reference indicate the same parts throughout the several figures, in which—

1 indicates a buggy; 2, the folding top; 3, the dashboard, and 4 the forward bow.

5 indicates the storm-front, which comprises the vertical folding front 6, stationary front 7, and folding side doors 8, the said vertical folding front 6 and side doors 8 being provided with transparent windows 9, preferably of celluloid or other transparent flexible material.

10 indicates the storm-apron, which, as shown, is secured in front of the dashboard by means of two straps 11, preferably buttoned under the body of the buggy. Said storm-apron is also provided with a strap 12 at each side thereof in order to button the apron in position, as shown in Figs. 1 and 2.

Referring to Fig. 6, it will be seen that the vertical folding front 6 is laid over a frame 13, the material of said frame being preferably round in cross-section and of any suitable metal. The said frame 13 is preferably of one piece of metal bent rectangular, the ends 14 of the frame material being secured together by a nipple or coupling 15.

16 indicates the stationary front frame, which, as shown, has its ends 17 curved to conform to the contour of the buggy-top.

18 indicates the side-door frames, which are shaped, preferably, as shown in order to conform to the rake of the forward bow of the buggy-top.

19 indicates the top frame of the storm-apron, and 20 indicates the front securing-rod, Figs. 6 and 7.

Referring to Fig. 6 and also to Fig. 9, it will be seen that a corner-casting 21 in two parts 22 and 23 is provided at both of the upper corners of the frame 13. The rear casting 23 is provided with a lug 24, with a hole 25 therein, and in each of the parts 22 and 23 is provided bolt-holes 26 in alinement, through which a bolt 27 passes to secure the said parts 22 and 23 in position on the frame.

It will be noted from Fig. 9 that the faces of the castings are each formed with a semicircular groove 28 to conform to the frame 13.

29 indicates the front hinges, which, as shown in Fig. 10, are made of two castings 30 and 31, the faces of which are provided with a vertical semicircular groove 32 and two horizontal grooves 33 and 34, coinciding bolt-holes 35 and 36 being provided for the reception of bolts 37 in order to secure the two castings together.

Referring to Fig. 7, it will be seen that the storm-front-securing rod 20 is bent inwardly at right angles to the rod, the extreme ends 38 being bent parallel to the main portion of the rod and threaded. In this connection, (referring to Fig. 11 and to Figs. 1 and 2) it will be seen that the link 39, Fig. 11, is provided with an opening 40 to receive the ends 38 of the rod 20, while flanges 41 are provided on the link in order to receive bolts 42 to secure the said link around the stud 43 on the front bow of the buggy-top.

44 indicates the end castings for the storm-apron 10, Fig. 14, and, as shown in Fig. 6, the storm-apron-frame rod 19 enters said castings, which are held in position by a set-screw 44'. It will be seen from Fig. 14 that a lug 45 is provided having an opening 46 in order to accommodate the locking-rod 47, as will be more fully described. The casting 44 is also provided with a series of bolt-holes 48, through which suitable bolts or rivets pass to secure the said castings to the storm-apron 10.

49 indicates the corner-casting for the folding side doors, Fig. 15, said casting being in two parts 50 and 51, the part 50 having a hook 52 preferably cast thereon, said hook engaging the forward bow of the buggy-top to hold the folding side doors 8 in position, as shown in Fig. 1. It will also be seen that the faces of the casting 49 are provided with a semicircular groove 53 to conform to the frame 18 of the said doors, while coinciding bolt-holes 54 are provided to receive a bolt to secure the two parts of the casting in position.

55 indicates the bottom corner-casting of the folding-front frame, Fig. 16, said casting being made in two parts 56 and 57. A lug 58 is provided on the part 56, through which the locking-rod 47 passes, said lugs acting as a guide for said rod, as shown in Fig. 6. The part 57 of the casting 55 is also provided with a lug 59, through which the frame 18 of the folding side door 8 passes, thereby forming a hinge, as shown in Fig. 6. The faces of the casting 55 are also provided with a semicircular groove 60 to conform to the frame 13, and coinciding bolt-holes 61 are also provided through which a bolt passes to secure the parts together in position.

62 indicates the locking-rod casting, Fig. 17, which, as shown in Fig. 6, is located on the frame 13 of the folding front. Said casting is provided with two lugs 63, acting as guides for the locking-rods 47, and a central extension 64 is provided between the said lugs 63, for a purpose which will be hereinafter fully described.

The locking-rods 47 are provided with an extension 65 on the inner ends thereof, which is between the lugs 63 and the extension 64, Fig. 6, while a stop 66 is located on said rods 47, and a coil-spring 67 is arranged between said stops 66 and the said lugs 63, said springs having an extension strain normally tending to hold the extension 65 on inner ends of the rods 47 against the lugs 63. In Fig. 6 one of the springs 67 is shown compressed.

68 indicates storm-front clamp, Fig. 8, said clamp comprising a hook member 69, which is passed over the top of the buggy, and an extension 70, constructed to carry a thumb-screw 71. 72 indicates the frame-engaging member of the clamp, which is passed on the hook member and provided with a semicircular seat 73 for the frame 16 of stationary front 7. A bearing 74 for the thumb-screw is provided behind the seat 73, as clearly shown in Fig. 8.

In order to secure the covering for the storm-front in position, the same is laid over the frame and stitched, the several corner-castings being secured to the frames on the outside of the cover, thus clamping the cover firmly in position and at the same time protecting the same. Referring to Fig. 5, it will be seen that the cover on the folding front 6 extends down below the locking-rods 47, forming a flap 75, so that when the storm-apron is in position the reins or lines 76 pass over the frame 19 of the said apron and under the locking-rods 47, thus allowing the reins to be handled from any position within the vehicle, the said flap 75 preventing the weather from entering the space between the storm-apron and storm-front, as shown in Fig. 5.

On the inside of the storm-apron is provided two straps 77 and 78, preferably elastic, and a suitable hook 79 is secured to the strap 78 in order to engage the central bow of the buggy-top, the strap 77 being secured at the forward bow in a manner which will be presently described.

In operation the mainsprings 80 are passed on the frame 13 before the ends of the frame are coupled together, said springs having a long arm 81 and its end 82 bent to engage the side bar 83 of said frame, as shown in Fig. 6. The other end of said spring is passed into one of the openings 84 in the spring-adjuster 85, Fig. 12, and said adjuster is then rotated on the frame 13 until the desired tension is secured, said tension being sufficient to raise the storm-front. A pin 86 is then inserted in one of the openings 84, which bears against the storm-front-securing rod 20, locking the adjuster 85 against rotation. From time to time as the spring weakens the same is adjusted as just described.

The folding side-door springs 87 are passed on the frames 18 of the side door, the upper ends of said springs being bent to encircle the side bars 83, as shown in Fig. 13, the lower end of the said springs forming an arm 88, bent to engage the lower bar 89 of said door-frames 18, as shown in Figs. 6 and 13. Sufficient tension is given said springs to cause them to have a normal tendency to fold the doors back against the folding front 6, as shown in Fig. 2.

In order to attach the storm-front to a vehicle, the stationary front 7 is clamped to the forward edge of the vehicle-top, as shown in Fig. 8, and the storm-front-securing rod is connected to the forward stud 43 of the top by means of the securing-link 39, as shown in Figs. 1 and 2. I might add here that as there is some slight variation in the breadth of the tops of buggies and vehicles of different manufacture I construct the ends 38 of the storm-front-securing rod sufficiently long to adapt it to the widest tops and can cut same to fit the narrower tops. When the stationary front is thus in position, the tendency of the mainsprings 80 is to carry the folding front 6 and doors 8 up against the vehicle-top above the heads of the occupants of the vehicle, as shown in Fig. 4. The front remains in this position until it is desired to use the same, at which time the folding front 6 is grasped and pulled down into a vertical position, the folding doors being normally folded back against the folding front.

When the folding front is in a vertical position, the folding doors 8, one at a time, are pulled out into position shown in Fig. 3, the hooks 52 on the inner lower corner of said doors engaging the forward bow of the vehicle-top, as shown in Fig. 1. When in this position, the tendency of the mainsprings to fold the front forces said hooks firmly against said bows, so that no further fastening for holding the front in position is required. The storm-front being now in position shown in Fig. 3, the storm-apron need not be attached if the weather does not warrant same, and for ingress and egress the front is pushed forward slightly until hook 52 on one of the doors 8 is out of engagement with the forward bow of the vehicle, when the door immediately folds back against the front 6, as shown in Fig. 2, thus allowing free and unobstructed communication between the inside and outside of the vehicle.

In order to attach the storm-apron 10 to the storm-front, the same is simply lifted until the frame 19 of the apron is in position shown in Fig. 6, one of the lugs 45 on the casting 44 being slipped on the locking-rod 47. The projection 65 on the inner end of the other locking-rod 47 and the central extension 64 on the casting 62 are grasped with the fingers and drawn together, which operation compresses the spring 67 and slides the locking-rod into position shown at A, Fig. 6. When the opening 46 in the lug 45 is in line with the locking-rod 47, the rod is allowed to slide outwardly, the end thereof entering the said lug 45, thus locking the storm-apron in position. The strap on the inside of the storm-apron, Fig. 5, being provided with perforations, said strap is passed on the end of the folding-door hook 8, as shown in Fig. 1. This, besides drawing the apron snugly up in position, absolutely locks the said hook to the forward bow of the vehicle-top, thereby obviating all possibility of accidental disengagement of said hook and the consequent folding up of the storm-front. The other strap 78, Fig. 5, is hooked over the central bow of the vehicle-top, as shown, which completes the fastening of the storm-apron. In order to permit ingress and egress, the said straps on one side of the apron are disengaged, which allows one side of the apron to fall down, as shown in Fig. 2, and the front pushed slightly forward, causing one side door to fold back against the front, as shown. It is thus seen that the remaining portion of the front is not disturbed, the remaining occupant or occupants of the vehicle, should there be any, not being subjected to the weather should one of their number emerge from the vehicle. In like manner a package or bundle may be handed out of the vehicle without subjecting the occupants to the weather.

Whenever it becomes necessary to disengage one side of the storm-apron from the storm-front, that side can be disengaged without disturbing the other side by simply grasping the projection 65 on the locking-rod on the side to be disengaged and the central projection 64 and pressing them together, which operation slides the said rod out of engagement with the lug 45 on the storm-apron, as shown in Fig. 6. In this manner either side of the storm-apron may be disengaged or both at the same time, if desired, by grasping the projections or thumb-pieces 65 on both rods and pressing them together, thus releasing both rods 47 from both lugs 45 on the storm-apron. By being able to operate one locking-rod at a time the apron can be handled much easier, and the reins need not be dropped from the hands. It is therefore apparent from my construction just described that free use of the hands and arms can be had when driving, and as clear sight can be had ahead and to both sides the storm-front can be used with absolute safety. It is further apparent that the storm-front is not dependent on the storm-apron, as either can be used without the other, and it also is apparent that free ingress, egress, and communication can be had between the inside and outside of the vehicle without taking the storm-front out of position and subjecting the occupants and interior of the vehicle to the weather.

Having thus fully set forth my invention, I do not wish to be understood as limiting myself to the exact construction herein set forth, as various slight changes may be made therein which would fall within the limit and scope of my invention, and I consider myself clearly entitled to all such changes and modifications which fall within the limit and scope of the following claims.

What I claim as my invention, and desire to secure by Letters Patent of the United States, is—

1. In a storm-front for vehicles, the combination with the top of the vehicle, of the stationary front arranged to be secured to said top, a folding front hinged under said stationary front, folding side doors hinged to said folding front and a storm-apron constructed to be detachably secured to said folding front, substantially as described.

2. In a storm-front for vehicles, the combination with the top of a vehicle, of a stationary front arranged to be secured to said top, a front securing-rod arranged to be connected to the studs on the said vehicle-top, a folding storm-front hinged below said stationary front, folding side doors hinged to said folding front, and a storm-apron constructed to be detachably secured to said folding front, substantially as described.

3. In a storm-front for vehicles, the combination with the top of the vehicle, of a stationary front arranged to be secured to said top, a storm-front-securing rod under said stationary front and constructed to be connected to the studs on said vehicle-top, a folding storm-front hinged under said stationary front and folding side doors hinged to said folding front, substantially as described.

4. In a storm-front for vehicles, the combination with the top of a vehicle, of a stationary front arranged to be secured to said top, a storm-front-securing rod under said stationary front, a link connecting said rod to a stud on the vehicle-top, a folding storm-front hinged under said stationary front, and folding side doors hinged to said folding front, substantially as described.

5. In a storm-front for vehicles, the combination with the top of the vehicle, of a stationary front arranged to be secured to said top, a folding front hinged under said stationary front, folding side doors hinged to said front, a locking-rod under said folding front, and a storm-apron arranged to be connected to said folding front by means of said locking-rod, substantially as described.

6. In a storm-front for vehicles, the combination with the top of the vehicle, of a folding front connected thereto, a locking-rod connected to said folding front, a storm-apron constructed to be connected to said folding front by means of said locking-rod and arranged to provide a space for the driving-reins between said folding front and said storm-apron, and a flap on said folding front to protect said space from the weather, substantially as described.

7. In a storm-front for vehicles, the combination with the top of a vehicle, of a folding front constructed to be secured to said top, locking-rods carried by said folding front, said locking-rods being provided with thumb-pieces thereon, a central extension on said folding front located between said thumb-pieces, a storm-apron being provided with means for engaging said locking-rods to connect said apron to said folding front, the said locking-rods being so arranged that either one or both may be disengaged from said storm-apron, substantially as described.

8. In a storm-front for vehicles, the combination with the top of a vehicle, of a folding front constructed to be secured thereto, folding doors hinged to said folding front, a hook on said folding doors constructed to engage the forward bow of said top to hold the storm-front in position, substantially as described.

9. In a storm-front for vehicles, the combination with the top of a vehicle, of a folding front constructed to be secured thereto, folding doors hinged to said folding front, means on said folding doors to engage the forward bow of said top, a storm-apron arranged to be detachably connected to said folding front, and means on said apron for engaging said forward bow to hold said apron in position, substantially as described.

10. In a storm-front for vehicles, the combination with the top of the vehicle, of a folding front constructed to be connected thereto, a spring connected to said folding front having a normal tendency to fold the front against the top of the buggy, folding side doors hinged to said folding front, springs for said doors having a normal tendency to fold said doors against said folding front, and means on said doors to engage the forward bow of said top to hold said folding front and folding doors in an open position, substantially as described.

11. In a storm-front for vehicles, the combination with the top of a vehicle, of a stationary front constructed to be secured to said top, a folding front hinged below said stationary front, a spring connected to said folding front and having a normal tendency to fold said front back against the top of the vehicle, folding side doors hinged to said front, springs connected to said doors having a normal tendency to fold said doors back against said folding front and means on said doors for holding said front and doors in an open position, substantially as described.

12. In a storm-front for vehicles, the combination with the top of a vehicle, of a stationary front constructed to be connected thereto, a folding front hinged under said stationary front, a spring connected to said folding front and having a normal tendency to fold said front back against the top of the vehicle, folding side doors hinged to said folding front, springs connected to said doors having a normal tendency to fold said doors back against the said folding front, and a storm-apron constructed to be detachably secured to said folding front, substantially as described.

13. In a storm-front for vehicles, the combination with the top thereof, of a stationary front constructed to be secured to said top, a folding front hinged under said stationary front, a spring connected to said folding front and having a normal tendency to fold said folding front back against the top of the vehicle, folding side doors hinged to said folding front, a spring on each of said folding side doors having a normal tendency to fold said doors back against said folding front, means on said folding side doors constructed to engage the forward bow of said vehicle-top to hold said folding doors in an open position, said means also acting to hold the said folding front in a vertical position, substantially as described.

14. In a storm-front for vehicles, the combination of a frame for the stationary front, a covering for said frame, a casting in two parts constructed to be secured at the corners of said stationary frame on the outside of said covering, and a folding front hinged to said stationary front, substantially as described.

15. In a storm-front for vehicles, the combination of a stationary front, a folding front hinged below said stationary front, said folding front comprising a frame and a covering therefor, castings in two parts at the corners of said folding front on the outside of said covering, substantially as described.

16. In a storm-front for vehicles, the combination of a folding front, folding side doors hinged to said folding front, said folding side doors comprising a frame and a covering therefor, a corner-casting in two parts at the lower corner of said folding side doors, said casting being secured to said doors on the outside of said covering and comprising means for engaging the forward bow of the vehicle-top to hold the said doors and front in an open position.

17. In a storm-front for vehicles, the combination of a folding front, and folding side doors hinged thereto, said front and doors comprising frames and coverings therefor, castings in two parts for said folding front and doors, said castings being secured to said front and doors on the outside of said coverings, substantially as described.

18. In a storm-front for vehicles, the combination of a stationary front comprising a frame and a covering therefor, a folding front comprising a frame and a covering therefor, corner-castings for said stationary front secured to said front on the outside of said covering, said castings forming hinges for said folding front, substantially as described.

19. In a storm-front for vehicles, the combination of a folding front and folding side doors hinged thereto, said folding front comprising a frame and a covering therefor, corner-castings secured to said folding front on the outside of said covering, said castings forming hinges for said folding doors, substantially as described.

20. In a storm-front for vehicles, the combination of a folding front, comprising a frame and a covering therefor, a locking-rod carried by said front, corner-castings secured to said front on the outside of said covering, said castings acting as a guide for said locking-rod, and a storm-apron constructed to be engaged by said locking-rod, substantially as described.

21. In a storm-front for vehicles, the combination of a folding front comprising a frame and a covering therefor, folding side doors hinged to said front, a locking-rod, corner-castings on said folding front, said castings acting as a guide for said locking-rod and as a hinge for said folding side doors, and a storm-apron constructed to be engaged by said locking-rod, substantially as described.

22. In a storm-front for vehicles, the combination with the top of the vehicle, of a stationary front constructed to be connected to said top, a folding front hinged under said stationary front and arranged to stand vertically when the storm-front is in operative position, folding side doors hinged to said folding front and provided with means for engaging the bows of the vehicle-top in such manner that one of said side doors may be opened to permit ingress and egress without moving the folding front out of its vertical position, substantially as described.

23. In a storm-front for vehicles, the combination with the top of a vehicle, of a folding front arranged to be secured thereto, folding side doors hinged to said folding front and provided with means for engaging the bows of the top to hold said front in a vertical position, a storm-apron constructed to be detachably connected to said folding front, and to the bows of the vehicle-top, said folding side doors and storm-apron being so arranged that one of said doors may be opened and one side of said storm-apron may be disconnected from the bows of the vehicle-top to permit ingress and egress without disconnecting the storm-apron from the folding front and without moving the folding front from its vertical position substantially as described.

In testimony whereof I affix my signature in presence of two witnesses.

JOHN MILTON HARTER.

Witnesses:
C. Hugh Duffy,
C. M. Forrest.